US009234573B2

(12) United States Patent
Saccucci

(10) Patent No.: US 9,234,573 B2
(45) Date of Patent: Jan. 12, 2016

(54) SPIRAL BICYCLE SPROCKET

(71) Applicant: World Bicycle Sports Inc., Port Coquitlam (CA)

(72) Inventor: Darcy Saccucci, Burnaby (CA)

(73) Assignee: World Bicycle Sports, Inc., Port Coquitlam, BC (CA)

( * ) Notice: Subject to any disclaimer, the term of this patent is extended or adjusted under 35 U.S.C. 154(b) by 242 days.

(21) Appl. No.: 13/863,342

(22) Filed: Apr. 15, 2013

(65) Prior Publication Data

US 2013/0274046 A1     Oct. 17, 2013

Related U.S. Application Data

(60) Provisional application No. 61/624,139, filed on Apr. 13, 2012.

(51) Int. Cl.
*F16H 55/30* (2006.01)
*B62M 9/10* (2006.01)

(52) U.S. Cl.
CPC .............. *F16H 55/303* (2013.01); *B62M 9/10* (2013.01)

(58) Field of Classification Search
CPC ................................ B62M 9/10; F16H 55/303
USPC ........................................ 474/160, 78, 80, 82
See application file for complete search history.

(56) References Cited

U.S. PATENT DOCUMENTS

| 4,259,873 | A | * | 4/1981 | Nagano et al. | 474/82 |
|---|---|---|---|---|---|
| 4,281,845 | A | * | 8/1981 | Brown | 280/236 |
| 4,781,663 | A | * | 11/1988 | Reswick | 474/49 |
| 5,033,991 | A | | 7/1991 | McLaren | |
| 8,512,182 | B2 | * | 8/2013 | Tam | 474/80 |
| 2005/0079940 | A1 | * | 4/2005 | Reiter | 474/160 |
| 2007/0135250 | A1 | * | 6/2007 | Kamada | 474/160 |
| 2009/0258740 | A1 | * | 10/2009 | Valle | 474/160 |
| 2010/0081531 | A1 | * | 4/2010 | Esquibel | 474/160 |
| 2011/0065541 | A1 | * | 3/2011 | Lai | 474/160 |
| 2011/0092327 | A1 | * | 4/2011 | Oishi | 474/160 |
| 2012/0329589 | A1 | | 12/2012 | Tam | |
| 2013/0072334 | A1 | * | 3/2013 | Braedt | 474/156 |
| 2013/0267362 | A1 | * | 10/2013 | Gheciu et al. | 474/80 |

FOREIGN PATENT DOCUMENTS

WO    WO 2012/009571    1/2012

OTHER PUBLICATIONS

International Search Report, Written Opinion, and Notice of Transmittal of Same mailed Oct. 21, 2013 in International App. PCT/IB2013/001406.

* cited by examiner

*Primary Examiner* — William E Dondero
*Assistant Examiner* — Robert T Reese
(74) *Attorney, Agent, or Firm* — Mahamedi Paradice LLP

(57) ABSTRACT

A spiral bicycle sprocket includes a first sprocket portion to rotate about a center axis and having a first number of teeth, a second sprocket portion to rotate about the center axis and having a second number of teeth, and a third sprocket portion positioned between the first and second sprocket portions and having a third number of teeth, wherein the third number of teeth form a conical and spiral thread that joins the first sprocket portion and the second sprocket portion.

10 Claims, 3 Drawing Sheets

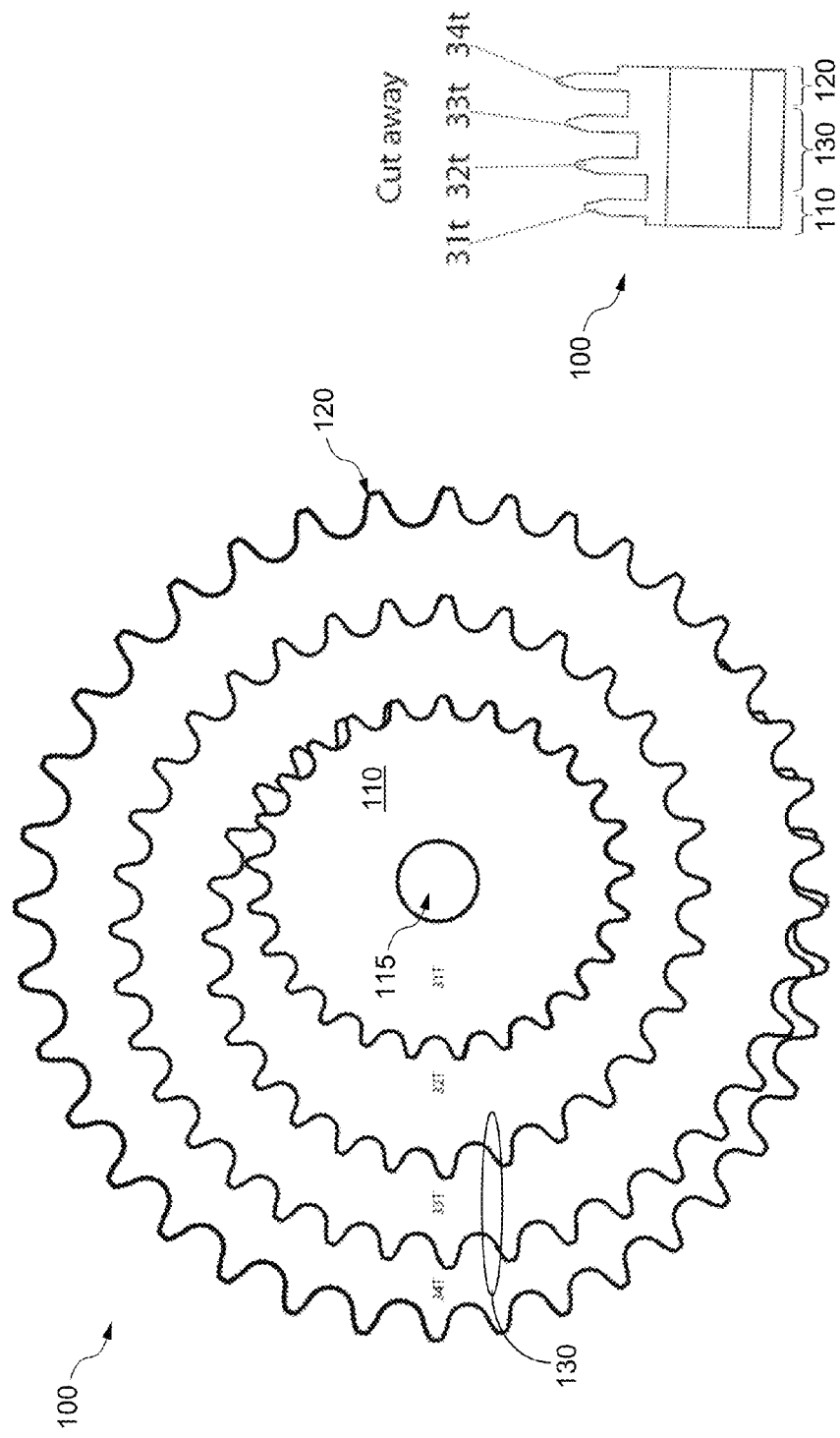

SPIRAL BICYCLE SPROCKET

CROSS-REFERENCE TO RELATED APPLICATIONS

This application claims the benefit under 35 USC 119(e) of the co-pending and commonly owned U.S. Provisional Application No. 61/624,139 entitled "SPIRAL BICYCLE SPROCKET" filed on Apr. 13, 2012, the entirety of which is incorporated by reference herein.

FIELD OF INVENTION

This invention relates generally to bicycles, and specifically to multi-speed sprockets for bicycles.

BACKGROUND

As bicycles increasingly become a popular form of recreation, exercise, as well as transportation, manufacturers and riders have sought to make bicycles that are more light-weight and versatile. Many bicycles have been designed to have a multi-speed function so that a rider can selectively vary the gear-ratio (also known as "speed-changing") between the driving (e.g., front) sprocket and the driven (e.g., rear) sprocket according to different road conditions. Speed-changing enables the rider to use a lower gear (e.g., with a sprocket with a lower teeth count) to generate greater low-end torque and easier start, and a higher gear (e.g., with a sprocket with a higher teeth count) to generate faster high-end speed. Typically, a gear-changing apparatus, for example, a well-known bicycle derailleur such as disclosed in the U.S. Pat. No. 4,259,873 to Nagano, is employed on the bicycle to shift a driving chain between a larger sprocket and a smaller sprocket in order to "change the speed." However, the gear-changing apparatus often involves push-pull control wires, control levers, springs, chain-guide pulleys, and/or other movable mechanical parts that are complex, heavy, and subject to wear and tear.

Indeed, in the realm of competitive cycling, reducing the possibility of mechanical failure and reducing the weight of a bicycle can provide the rider with great competitive advantages, and they often take priority over having the benefit of speed-changing because of those drawbacks associated with gear-changing apparatus mentioned above. For example, in track cycling where bicycles are raced on specially built banked tracks, or in BMX competitions where bicycles are ridden in a harsh or off-road environment, the riders often opt for single-speed bicycles over multi-speed bicycles because of the possible mechanical failures, extra weight, and/or cost involved with conventional speed-changing mechanisms. As such, to get the best the overall performance, compromising decisions have to be made in selecting a single gear-ratio in hope that the selected gear-ratio would sacrifice neither too much low-end torque nor too much top-end speed.

Thus, it would be highly desirable to provide a bicycle sprocket that retains multi-speed functionality with a minimum number of moving parts while still being durable, light-weight, and easy to manufacture.

BRIEF DESCRIPTION OF THE DRAWINGS

The features and advantages of the present invention are illustrated by way of example and are by no means intended to limit the scope of the present invention to the particular embodiments shown, and in which:

FIG. 1 is a side plan view of a spiral bicycle sprocket in accordance with the present embodiments;

FIG. 2 is a cross-sectional view of the spiral bicycle sprocket of FIG. 1;

Like reference numerals refer to corresponding parts throughout the drawing figures.

DETAILED DESCRIPTION

A spiral bicycle sprocket is described below that allows the rider to enjoy both benefits of low-end torque and high top-end speed as would be provided by a multi-speed sprocket system. Furthermore, the bicycle sprocket of the present embodiments includes a fewer number of parts and weighs less than prior art multi-speed bicycle sprocket systems without sacrificing strength or durability.

Figure 3:
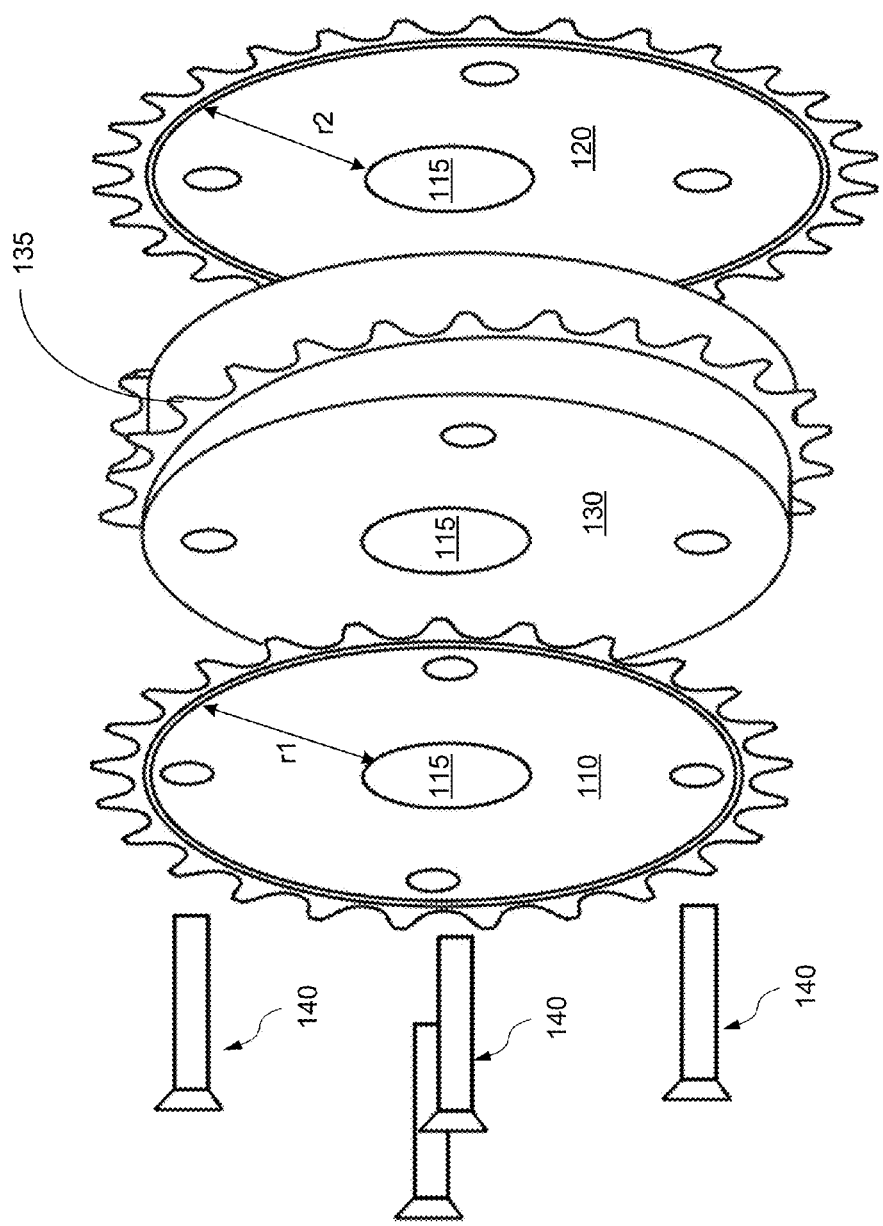
FIG. 3 is an exploded perspective view of the spiral bicycle sprocket of FIG. 1.
Figure 4:
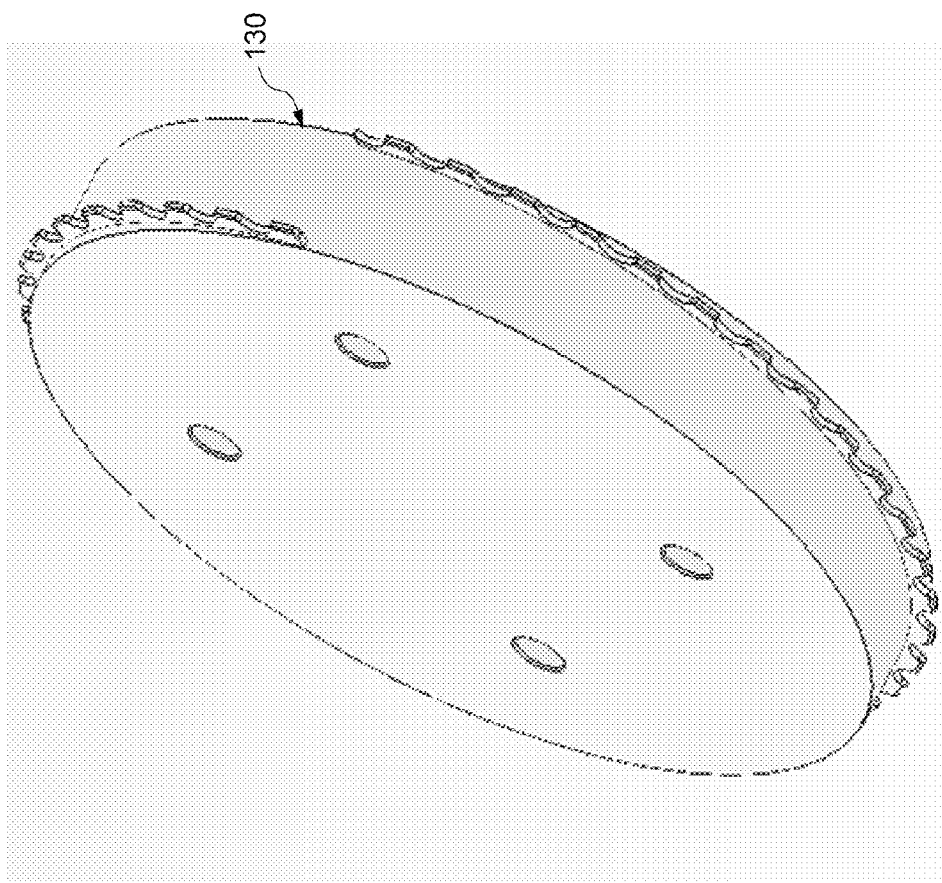
FIG. 4 is an elevated perspective view of the third sprocket portion of FIG. 1.

FIGS. 1-3 show a spiral bicycle sprocket 100 in accordance with some present embodiments. Sprocket 100 includes a first sprocket portion 110, a second sprocket portion 120, and a third sprocket portion 130. Sprocket 100 can be made from any strong, durable, and lightweight material including, for example, a composite material, aluminum, alloys, titanium, or other suitable materials. In some embodiments, the first, second, and third sprocket portions 110, 120, and 130 may be formed as separate components and may be coaxially mounted together to form sprocket 100, for example, as shown in FIG. 3. For such embodiments, the first, second, and third sprocket portions 110, 120, and 130 may be connected together using bolts or pins 140, as depicted in FIG. 3.

In other embodiments, the first, second, and third sprocket portions 110, 120, and 130 may be forged as a single (e.g., monolithic) piece using a 3-D fabrication process, although other suitable fabrication methods can be used. Although forging sprocket 100 as one piece decreases the possibility of having different combination of sprocket portions and may increase manufacturing costs, it makes sprocket 100 even more light-weight and durable because no mounting mechanism is needed.

For purposes of discussion herein, the present embodiments are assumed to be employed on the driving sprocket (e.g., the front sprocket) of a bicycle, although a person having ordinary skill in the art will understand that the scope of the disclosure herein includes the same techniques being employed on the driven sprocket (e.g., the rear sprocket) or any suitable intervening sprocket as well.

The first sprocket portion 110 includes a first number of teeth extending outwardly from a periphery of the first sprocket portion 110, and is positioned such that it can rotate about a center axis 115. The teeth are to receive a driving chain (not shown in FIG. 1), which in turn is coupled to the driven sprocket on a bicycle to transfer torque to a wheel (e.g., the rear wheel) of the bicycle. Typically, the driving chain is formed by a plurality of chain connectors linked to each other. Each tooth on the sprocket portion is used to receive a single chain connector. As such, the number of teeth on a sprocket portion generally corresponds to a radius that characterizes the sprocket portion. According to one embodiment, the first sprocket portion 110 has 31 teeth. Of course, a manufacturer may select the number of teeth (and/or the radius) of a sprocket portion to suit its own purposes, and thus the number of teeth on the first sprocket portion 110 may vary.

The second sprocket portion 120 includes a second number of teeth extending outwardly from a periphery of the second sprocket portion 120, and is positioned such that it can rotate about the same center axis 115 as the first sprocket portion 110. According to the present embodiments, the second sprocket portion 120 may serve as the high gear for sprocket 100, and the first sprocket portion 110 may serve as the low gear for sprocket 100. As such, the second sprocket portion 120 may have more teeth than the first sprocket portion 110 so that a radius that characterizes the second sprocket portion 120 is greater than that of the first sprocket portion 110. For example, FIG. 3 depicts a radius (r2) of the second sprocket portion 120 as being greater than a radius (r1) of the first sprocket portion 110. According to one embodiment, the second sprocket portion 120 has 34 teeth. Of course, a manufacturer may select the number of teeth (and/or the radius) of a sprocket portion to suit its own purposes, and thus the number of teeth on the second sprocket portion 120 may vary.

The third sprocket portion 130 includes a third number of teeth extending outwardly from a periphery of the third sprocket portion 130, and is positioned between the first sprocket portion 110 and the second sprocket portion 120. According to the present embodiments, the third number of teeth on the third sprocket portion 130 are arranged in a conical and spiral thread that joins the first sprocket portion 110 and the second sprocket portion 120. In other words, the conical and spiral thread formed by the third number of teeth on the third sprocket portion 130 has a gradually increasing radius so that when sprocket 100 rotates forward (e.g., from being peddled in a first direction to move the bicycle forward), the third sprocket portion 130 can guide the driving chain to gradually progress from the smallest sprocket portion (e.g., the first sprocket portion 110) to the largest sprocket portion (e.g., the second sprocket portion 120). In this manner, the third teeth of the third sprocket portion 130 may provide a transition 135 between the first teeth of the first sprocket portion 110 and the second teeth of the second sprocket portion 120. In this manner, the third sprocket portion 130 may serve as transitional gear that allows a chain (not shown for simplicity) to seamlessly transition from the low gear (e.g., formed by the first sprocket portion 110) to the high gear (e.g., formed by the second sprocket portion 120).

Notably, once the driving chain reaches the largest sprocket portion 120, as long as sprocket 100 does not rotate backwards, the driving chain stays on the largest sprocket portion 120. In some embodiments, a freewheel can be included on a suitable position (e.g., on the driven sprocket) in the bicycle, so that when sprocket 100 rotates backwards (e.g., from being peddled in an second direction opposite the first direction), the driving chain may reverse its position back onto a smaller sprocket portion (e.g., onto the first sprocket portion 110 or the third sprocket portion 130). In some embodiments, a well-known chain tensioner can also be included in the bicycle to maintain the proper chain tension.

In this manner, a bicycle that incorporates a sprocket system including sprocket 100 can achieve "speed-changing" without any conventional gear-changing apparatus such as front and/or rear bicycle derailleurs. More specifically, the present embodiments enable a rider to take full advantage of the fact that, in a racing environment, once the largest sprocket portion (or "the top gear") is reached for high-end speed, any smaller sprocket portion that is used for quick startup is unlikely to be selected or engaged again throughout the race event. Therefore, the present embodiments are especially useful when the bicycle is used in a competitive cycling environment, for example, in track cycling or BMX racing, where one-time quick acceleration and high top speed are desirable. Of course, the present embodiments may be employed in any suitable bicycle (e.g., such as a conventional single-speed beach cruiser bicycle) to allow a rider to more quickly accelerate from a stationary position.

Further, because sprocket 100 does not include any traditional gear-changing apparatus, a bicycle that incorporates sprocket 100 is more durable and light-weight than traditional bicycles. As such, the riders of such bicycles that employ the present embodiments can enjoy multi-speed functionality without the penalty of having increased weight and possible mechanical failures associated with conventional gear-changing mechanisms.

According to other embodiments, a bicycle with a spiral sprocket system is disclosed. The spiral sprocket system includes (1) a driving sprocket having a plurality of driving sprocket portions, each with a different radius; (2) a driven sprocket; and (3) a driving chain that connects the driving sprocket and the driven sprocket; wherein the plurality of driving sprocket portions are arranged by their radii in ascending order to form a continuous, conical and spiral thread.

As an additional embodiment, a spiral bicycle sprocket is disclosed having a plurality of teeth, wherein a first group of the plurality of teeth are arranged in a conical and spiral manner to form a first sprocket portion having an increasing radius until the radius reaches a final length, and wherein a second group of the plurality of teeth are arranged in a circular manner to form a second sprocket portion having a radius of the final length.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the scope of this invention.

What is claimed is:

1. A spiral bicycle sprocket, comprising:
a first sprocket portion to rotate about a center axis and having a number of first teeth;
a second sprocket portion to rotate about the center axis and having a number of second teeth, the number of second teeth being greater than the number of first teeth; and
a third sprocket portion positioned between the first and second sprocket portions and having a number of third teeth,
wherein the number of third teeth form a conical and spiral thread to provide a transition between the first teeth of the first sprocket portion and the second teeth of the second sprocket portion.

2. The spiral bicycle sprocket of claim 1, wherein the first, second, and third sprocket portions are formed as a single piece.

3. The spiral bicycle sprocket of claim 1, wherein the conical and spiral thread rotates in a radial direction.

4. The spiral bicycle sprocket of claim 1, wherein the number of first teeth is 31, and the number of second teeth is 34.

5. The spiral bicycle sprocket of claim 1, wherein:
the first sprocket portion forms a low gear of the spiral bicycle sprocket;
the second sprocket portion forms a high gear of the spiral bicycle sprocket; and
the third sprocket portion forms a transitional gear between the low gear and the high gear.

6. The spiral bicycle sprocket of claim 1, wherein:
the first sprocket portion has a first radius; and
the second sprocket portion has a second radius that is greater than the first radius.

7. The spiral bicycle sprocket of claim 6, wherein:
the third sprocket portion has a third radius that gradually increases from the first radius to the second radius.

8. A spiral bicycle sprocket having a plurality of teeth, a first group of the plurality of teeth arranged in a circular manner to form a first sprocket portion having a first radius, a second group of the plurality of teeth arranged in a circular manner to form a second sprocket portion having a second radius that is greater than the first radius, and a third group of the plurality of teeth arranged in a conical and spiral manner to form a third sprocket portion having a third radius that gradually increases from the first radius to the second radius.

9. The spiral bicycle sprocket of claim 8, wherein the third group of the plurality of teeth provide a transition between the first group of the plurality of teeth and The second group of the plurality of teeth.

10. The spiral bicycle sprocket of claim 8, wherein the first sprocket portion forms a low gear, the second sprocket portion forms a high gear, and the third sprocket portion forms a transitional gear between the low gear and the high gear.

\* \* \* \* \*